Aug. 31, 1954  O. A. KNOPP  2,688,117
ELECTRIC METER TESTING APPARATUS
Filed June 26, 1947  5 Sheets-Sheet 1

OTTO A. KNOPP, deceased,
INVENTOR
BY Louise B. Knopp, executrix,
BY
ATTORNEY

Aug. 31, 1954

O. A. KNOPP 2,688,117

ELECTRIC METER TESTING APPARATUS

Filed June 26, 1947

OTTO A. KNOPP, deceased,
INVENTOR
BY Louise B. Knopp, executrix,

BY Ervin L. Johnson
ATTORNEY

Aug. 31, 1954

O. A. KNOPP 2,688,117

ELECTRIC METER TESTING APPARATUS

Filed June 26, 1947

OTTO A. KNOPP, deceased,
INVENTOR
BY Louise B. Knopp, executrix,

BY
Erwin L. Johnson
ATTORNEY

Aug. 31, 1954

O. A. KNOPP 2,688,117

ELECTRIC METER TESTING APPARATUS

Filed June 26, 1947

OTTO A. KNOPP, deceased,
INVENTOR
BY Louise B. Knopp, executrix,

BY

*Ervin G. Johnson*
ATTORNEY

Aug. 31, 1954　　　　O. A. KNOPP　　　　2,688,117
ELECTRIC METER TESTING APPARATUS
Filed June 26, 1947　　　　　　　　　　　　　　　5 Sheets-Sheet 5

OTTO A. KNOPP, deceased,
INVENTOR
BY Louise B. Knopp, executrix,

BY
ATTORNEY

Patented Aug. 31, 1954

2,688,117

UNITED STATES PATENT OFFICE 2,688,117

ELECTRIC METER TESTING APPARATUS

Otto A. Knopp, deceased, late of Oakland, Calif., by Louise B. Knopp, executrix, Oakland, Calif.

Application June 26, 1947, Serial No. 757,270

28 Claims. (Cl. 324—74)

This invention relates to electrical energy-meter testing equipment for testing watt-hour meters and the like, especially to such equipment as used by public utilities for routine testing and adjustment of customer service meters to insure their accuracy.

This type of equipment is required to be of sustained high and reliable accuracy, and is therefore composed of precision components the construction of which requires considerable skill. Accordingly, the equipment is desired to have the greatest possible diversification of use. Several improvements in this type apparatus are described in the following specification and the circumstances which have led to these various improvements will now be pointed out in connection with the several objects of the invention.

*Phase angle compensation.*—In apparatus of the character herein described for the testing of watt-hour meters the currents and voltages applied to the meter under test are not the same currents and voltages as are applied to the rotating standard meter. The arrangement is such that currents and voltages which are directly applied to the standard are for all tests substantially of the same order of values. In this way only one rotating standard is required and it operates at practically 100% accuracy when subjected to currents and voltages within a very few percent of its rated current and voltage. Depending upon what voltages and currents are applied to the meter to be tested by the apparatus, corresponding adjustments are made in the ratios of transformation of such applied voltages and currents to apply rated voltages and currents to the rotating standard. By causing the rotating standard to, for all tests, have nearly the same values of current and voltage applied thereto, it may be adjusted for precision accuracy of indication of such values and its readings are correct without the application of correction factors.

As a more concrete example, consider a testing apparatus arranged for testing many single-phase watt-hour meters in sequence, any one of which may operate at one of the three voltages 110, 220, or 440 volts, and any one of which may operate at 5, 10, 15, 25, or 50 amperes. If a meter to be tested shows by its nameplate that it operates on a consumer service at 220 volts and that its normal load current is 25 amperes the operator of the testing apparatus arranges to apply 220 volts and 25 amperes to his watt-hour meter. During the testing of the meter the rotating standard meter has 110 volts and 5 amperes applied to its coils, these values being those for which the indications of the rotating standard are precisely accurate. At the completion of the test the indicating pointer of the rotating standard indicates the error, or correction factor, of the watt-hour meter under test. Again, if the meter next to be tested shows by its nameplate that it operates on a consumer service at 110 volts and 5 amperes, the operator arranges the apparatus to apply 110 volts and 5 amperes to the watt-hour-meter under test. While the test proceeds the rotating standard meter has, as before, 110 volts and 5 amperes applied to its voltage and current coils. At the completion of the test the indicating pointer of the rotating standard indicates the error or correction factor of the second watt-hour meter.

In order to attain these desirable features of operation, various devices including special loading and precision voltage and current transformers are employed in the apparatus to provide any of the currents and voltages required for the meters to be tested and to transform whatever voltages and currents there are so applied to the voltages of the order of 110 volts and currents of the order of 5 amperes, which 110 volts and 5 amperes are applied to the voltage and current coils of the rotating standard. Thus, if the voltage applied to the meter under test is precisely 440.00 volts, the voltage applied to the rotating standard is precisely 110.00 volts; and if the current during this period applied to the current coil of the meter under test is 50.00 amperes precisely, then the current applied to the current coil of the rotating standard is precisely 5.00 amperes. Moreover, the potential instrument transformer which transforms 440 volts to 110 volts, transforms precisely according to the ratio 440.00/110.00 for departures of the order of two or three percent above and below 440 volts, and the precision current transformer transforms in precisely the ratio 50.00/5.00 over similar departures of two or three percent above and below 50 amperes. For these reasons the voltage and current applied need not be maintained precisely at the rated values in order to obtain a precise indication of the accuracy of the meter under test, because though the voltage and current under test fluctuates so as to affect the total registration of the meter under test, the transformed voltages and currents which are applied to the standard fluctuate in precise proportion thereto so that the standard registers exactly in linear proportion to the amount of energy which the meter under test ought to register if it is in calibration.

It is in effecting these transformations of voltage and current that complications set in which introduce inaccuracy into the phase relationship between the secondary voltage of the precision voltage transformer and the secondary current of the precision current transformer, which phase relationship ought to be the same as the phase relation between the current flowing in the current coil of the meter under test and the voltage applied to its voltage coil. The precision current transformer in transforming its primary current passing from it to the meter under test, produces a current in the secondary circuit which leads the primary current by a small phase angle such as twenty minutes. The precision voltage transformer in transforming the voltage applied to the voltage coil of the meter under test to the secondary voltage to be applied to the standard, introduces a much larger phase displacement which is of the order of one hundred and twenty minutes. Accordingly, while the current in the coil of the standard leads the current in the meter under test about twenty minutes, the voltage applied to the standard leads the voltage applied to the meter under test about six times as many minutes. The voltage applied to the potential coil of the standard ought to be in the same phase relation to the current in its current coil as the phase relation of the current and voltage in the meter under test.

In prior apparatus of this character the lag coil of the rotating standard has been adjusted so that the effect was the same as if the voltage and current applied to the standard were in the same phase relation as the current and voltage in the meter under test, and in this manner precision was achieved in the standard's integration of the product of voltage and current applied to the watt-hour meter under test. By accomplishing this specific purpose in other ways herein described several advantages accrue, some of which will now be pointed out.

The practice of adjusting the lag coil of the rotating standard for the purpose above indicated is objectionable because of its permanent effect on the standard. The lag adjustment is a permanent adjustment in the sense that it requires laboratory facilities and the time of personnel to make it. Accordingly, any adjustment which makes it fit only one external apparatus precludes its ready use for other purposes. Such standards are expensive and should be usable apart from the apparatus forming the subject matter of this invention. It is also desirable that such standards be interchangeable, without requiring adjustment to fit with the testing apparatus, so that it need not be furnished by the manufacturer as a part of the testing apparatus. By this invention the need for adjusting the lag coil of the rotating standard is eliminated.

The new method is to so provide that the voltage applied to the voltage terminals of the rotating standard is substantially in the same phase relation to the current in its current coil, as the voltage applied to the meter under test is to the current in its current coil. This avoids any need for altering a certified accurate portable rotating standard as supplied by the manufacturers of such meters. Accordingly the apparatus of this invention can be supplied to a laboratory and that laboratory can install any standard of this character without having to adjust it to fit the apparatus.

It is, accordingly, one of the principal objects of this invention to provide a testing apparatus of the character referred to such that a portable watt-hour meter standard may be installed therein without need for adjusting the lag coil of the standard meter.

In making provision for accomplishing the foregoing object certain considerations govern the choice between two alternatives. One of the alternatives is to make the phase displacements due to the two precision instrument transformers of such values in themselves that conditions in the meter under test are adequately represented at the standard. The other alternative, which is preferred and described herein, is to suppy a corrective voltage component in the circuit with the secondary voltage of the precision voltage transformer sufficient to cause the resultant voltage applied to the voltage coil of the standard to have the same phase relation as it would have to the current were the first alternative adopted. The preferred alternative is much cheaper than the first mentioned alternative because it requires the use in the apparatus of only a very small inexpensive compensating transformer and suitable connections for extension to the usual three-phase laboratory or test room source of supply; while in the first alternative the manufacture of one of the precision transformers to make its phase angle agree with the phase angle of the other entails great care and expense. For example, the phase angle of the precision voltage transformer can be made equal to the phase angle of the current transformer by the use of a great amount of expensive iron laminations in its core which results in a larger amount of copper in the winding; only a fraction of this amount of iron and copper is required when the preferred alternative is practiced.

*Load current circuits and circuit components.*—One of the particular advantages of this testing apparatus is that it is manufactured with great economy of materials and construction effort. Thus: the load currents are changed by moving but one movable contact; only one tap is required for each value of nominal current supplied by the loading apparatus; continuous conductors are employed for winding on two transformers and for taps required to carry the load current corresponding to the current required of the windings involved with the result that splicing operations are minimized; and by a unique arrangement the same winding is effective on two transformers thus practically cutting the windings costs in half and reducing the space requirement of the apparatus very substantially. These factors also reduce the contact resistance in the switch apparatus and avoid several opportunities for failures at splices and taps.

*Testing two-wire meters and three-wire meters.*—In the distribution of single-phase power, both single-phase two-wire and single-phase three-wire systems of service wiring are used by different consumers; and, accordingly, two distinct energy meters having different dynamic structures are required to measure the energy consumed in conjunction with each system. In making tests of the two kinds of watt-hour meters a single testing apparatus capable of testing either kind of meter with equal precision and speed is desirable and it is one of the objects of this invention to provide such equipment.

By the former method of testing single-phase three-wire watt-hour meters much in use, it is necessary to disconnect the voltage coil from the current coils in order to make the test. Inasmuch as the disconnection is made it is necessary to provide inspection facilities to insure that the connection has been reestablished after the test. It is another object of the invention to so provide that such disconnecting is unnecessary in making tests and so to gain the advantage of omitting the heretofore necessary inspection to see that the connection is re-established, such inspections having heretofore been necessary to make certain that the meter registers when installed on the customer's premises and to avoid loss of revenue.

In testing a two-wire watt-hour meter the load current applied thereto has but one coil to traverse, but in testing a three-wire watt-hour meter the load current must traverse two current coils. In testing both types it is best to merely simulate power consuming conditions. This is done by employing separate circuits for energizing the voltage and the current coils, thus using current at very low voltage so as to require the dissipation of negligible amounts of energy in making the tests. Heretofore the method employed in testing the three-wire meters included forcing the current through the coils connected in series to the same voltage source. This involved the disadvantage of requiring the disconnection of the voltage coil which, in all such meters, is normally connected between the current coils within the meter housing. The purpose of making this disconnection is to prevent current from the voltage source from passing through the current coil circuit, which circuit is of very low resistance and would not only short circuit the voltage source but would also result in the dissipation of much energy. By the present invention, instead of disconnecting the voltage coil it is left in circuit across the current coils and the current coils are isolated during test in such a way that equal in-phase currents can flow in both current coils, but that these currents are entirely distinct. For example, in testing the three-wire meter the currents are supplied from distinct loading transformer windings between which no current can circulate over the potential coil connection. Since the voltage coil is disconnected to each current coil circuit at one point only there is no dynamic effect produced in the current coils by the presence of the connection.

Because by the method of this invention but one rotating standard is required to test any watt-hour meter whatever the current and voltage capacity of the meter may be, certain qualities are required in the loading arrangements for the meters under test. In the testing of three-wire meters and two-wire meters having equal full load ratings they usually have the same watt-hour constant so the two-wire meter requires the same value of current through its one coil as does the three-wire meter through each of its two coils, to produce equal rotations of the discs. In each case precisely the same amount of energy has been applied to the meters when their discs have each rotated ten times irrespective of the duration of application, the current fluctuation, or the voltage fluctuation.

By this invention precisely the same loading transformer windings and standard are alternatively used to test either type of meter, and the choice of test arrangement for a particular meter is made by merely moving a single switch lever. Isolation of the test load currents for the three-wire meter is accomplished by separation of two equal windings of a transformer source.

It is another object of this invention to employ an arrangement of circuit components such that the aggregate of resistance values employed is a minimum.

*Testing watt-hour meters having different watt-hour constants.*—Prior to recent general adoption by the industry of uniform service-meter constants for meters of different manufacturers, there were various meter constants in use; that is, one rotation of the disc of a watt-hour meter of one manufacturer would be produced by a different quantity of watt-hours than one rotation of the corresponding disc of another manufacturer's meter. The adoption of uniform constants for such meters discourages the future installation of separate equipment for testing meters having several different constants and possibly also results in the omission to test certain meters. Inasmuch as such meters continue in use they require testing. It is the pertinent object of this invention to provide so that the preferred method of test described hereinafter may be easily applied to a watt-hour meter having any one of the several watt-hour constants, by the operation of a single selector, and so that, should the selection not be made the operator is put on inquiry by the gross error appearing as a result of the test.

*Calibration of current measuring apparatus.*—It is another object of this invention to provide an improved arrangement of apparatus for the calibration of current meters and transformers.

*Optical system.*—The facility with which the testing apparatus may be used by the operator is determinative of both his productivity and accuracy. It is one of the features of this invention that the operator can see the face of a standard meter while counting the revolutions of the watt-hour meter under test. The reasons for and the advantages of an arrangement permitting this to be done will now be pointed out.

Testing apparatus of this character commonly employs a portable so-called "rotating standard," which is a precision instrument well known in the art, designed for testing work. It must be handled carefully to prevent impairment of its accuracy. This standard is also used in fixed position in laboratories where its precision and accuracy may be maintained over long periods of time without attention. Both the rotating standard and the watt-hour meter under test are designed for maximum sustained accuracy and therefore, usually employ a vertical spindle to provide efficient bearing structure, with a minimum of frictional variation, for the rotors therein. For testing, therefore, both instruments are disposed with their spindles in a vertical position.

The indicating faces or dials of watt-hour meters are disposed vertically, being so mounted on the premises of an energy consumer for convenience in routine meter reading for accounting purposes. The indicating dial of the type of rotating standard here preferred is disposed in a horizontal plane. This caused the meter and standard in prior apparatus to be so arranged that the user would have to move his head to look from the face of the rotating standard to the face of the watt-hour meter under test in the normal procedure of test.

The procedure followed in making a test by the preferred method has heretofore involved the following essentials: the standard meter and the meter under test are subjected to the corresponding conditions of voltage and current for a fixed number, as 10, rotations of the disc of the meter under test. This number has been selected so that the standard meter registers a multiple of the value of the correction factor of the meter under test and such that this registered multiple value may be reduced to the value by a mental shift of a decimal point to obtain the correction factor. If the meter under test is actually without error, that is, if the correction factor is precisely unity the large revolving pointer of the standard returns exactly to its starting point (zero position) at the end of ten revolutions, which end coincides with the end of the period required by the meter under test to complete the fixed number (ten) of revolutions for the full load test, or one revolution for the light load (10%) test. With this test procedure on both the full and the light load tests the standard complete ten revolutions while the meter under test ought to complete one revolution at 10% of full load, and the registration of the standard shows ten times the error of the meter under test. At full load on the meter under test the standard completes exactly one revolution while the meter under test ought to rotate exactly one revolution. When one rotation of the standard has actually been completed, the standard shows the percent error and the correction factor by which the meter under test's reading ought to be multiplied in order to obtain the correct amount of energy passing the meter.

Certain precautions must be taken. If the operator does not, in each instance of test, assure himself that the standard as well as the meter under test is registering, an erroneous conclusion can be drawn by the operator in the following circumstances: suppose the operator operates the controls to start the rotating standard from zero when a certain mark on the disc of the meter under test passes a datum point on the meter frame and then, without looking at the pointer of the rotating standard to assure himself that it is in motion, continues to observe the disc of the meter under test to be sure he misses no rotations while counting the revolutions of the disc and, when ten revolutions are complete, operates the control to stop the standard. Since the operator has not assured himself that the rotating standard registered during the period he has the controller on, he is only justified in drawing the conclusion that the rotating standard has registered if the revolving pointer thereof registers a value other than zero. If, in fact, the pointer of the standard indicates a correction factor of precisely unity he has a choice of concluding that either (1) the rotating standard did not register, that is, was not actually energized, or (2) the meter under test has zero error (unity correction factor). If most of the meters tested actually exhibit errors, the first choice is probably the correct one; but a conclusion cannot properly be predicated upon the mere probability; only actual observation of the true condition is acceptable. In the circumstance that the majority of the meters tested actually have an error, an occasional operator will become accustomed to relying upon the erroneous conclusion that the operation of the rotating standard is certainly indicated by its registration of a value other than zero in most of the instruments tested, and will acquire the habit of omitting to look at the rotating standard after operating the test start controller.

Such habit is productive of false results because it can occur that the rotating standard, through wear of associated apparatus or other unpredictable cause, occasionally but not invariably, will fail to register in response to the starting operation of the controller. This possibility for failure of the rotating standard to operate is one the operator should guard against by looking at the register of the standard immediately after operating the start switch to satisfy himself that the pointer is revolving. Non-operation of the standard will not be detected by the operator if he has acquired the habit of omitting to look at the rotating standard after each time he actuates the controller for the purpose of starting the testing operation. The sporadic occurrence of such non-operation occasionally results in the certification of a meter as having a zero error when in fact its error has not been determined.

It is, therefore, desirable to so provide that the operator can see motion of the rotating standard pointer as well as the rotation of the meter under test, simultaneously and without removing his observation from the meter under test. It is one of the objects of this invention so to provide.

When the face of a rotating standard is viewed in a mirror, the elements of the face are inverted in the image so that the appearance of the image is unreadable in the conventional way. The apparent rotation of the instrument is, moreover, counter to that of the pointer as viewed from the observation point and the entire instrument face appears inverted. It is one of the objects of the invention to so provide that the instrument face, and the operation of the pointer, appear normal when the instrument is viewed in a mirror. This avoids confusion and personnel errors because operators usually have become familiar with rotating standards in field and laboratory testing prior to the introduction of the presently described improvements, and the dials of new apparatus having the same functions as prior standards should be identical with those prior standards as regards appearance and readability.

Other objects of this invention will appear in the following specification wherein reference is made to the accompanying drawings, in which like reference characters refer to like parts, and in which:

Fig. 1a is a vector diagram;

*Phase-angle compensation*

Figure 1:
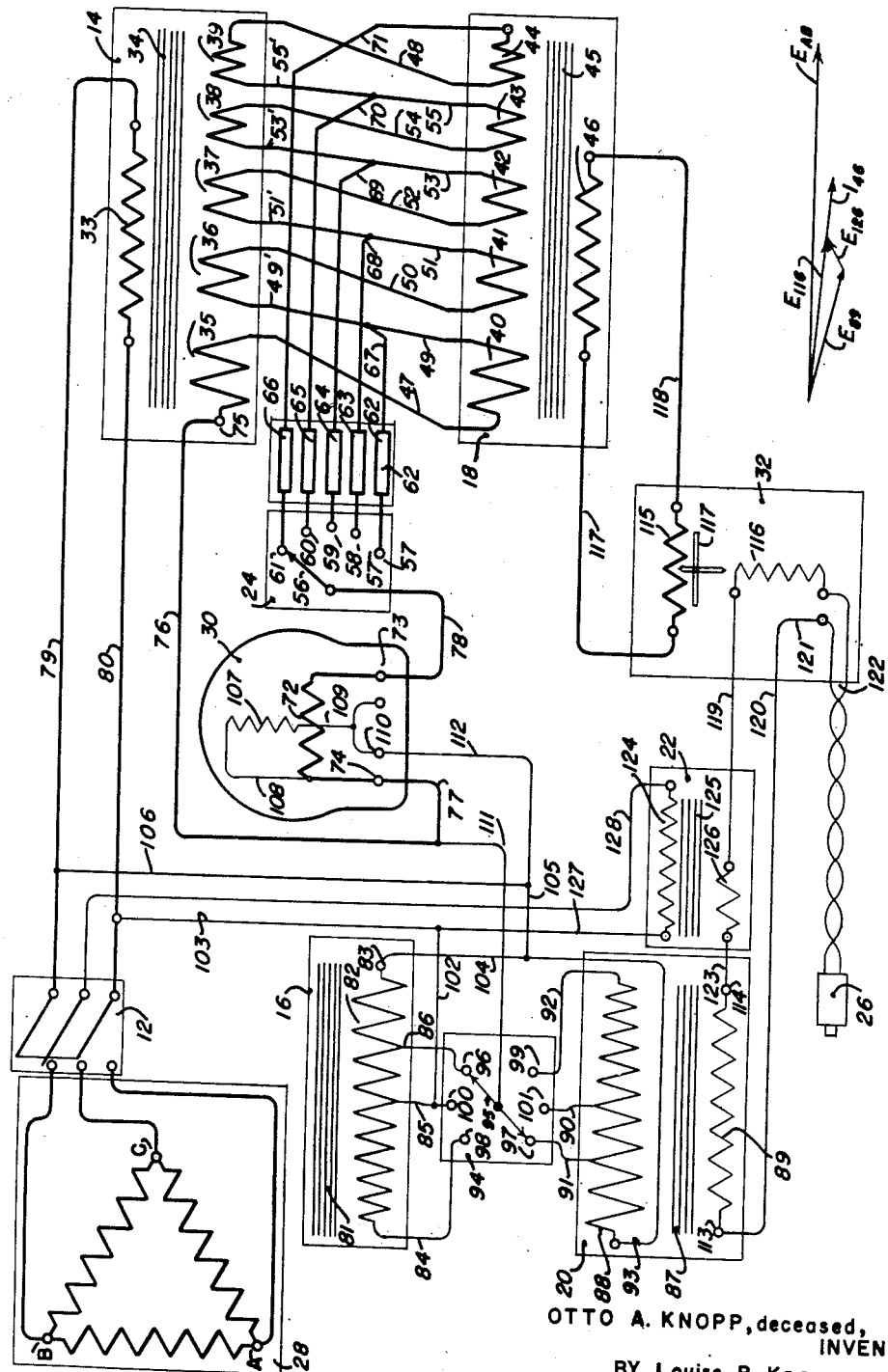
Fig. 1 is a wiring diagram showing the arrangement of apparatus as used for testing single-phase two-wire watt-hour meters.

It has been pointed out that one of the objects of this invention is to provide so that the phase relations between the voltage and the current as applied to the rotating standard shall be substantially identical with the phase relation between the current and the voltage as applied to the watt-hour meter under test. A simplified wiring diagram illustrating the preferred manner of achieving this objective is given by Fig. 1, the arrangement of which will be first generally and then particularly described.

The apparatus comprises three pole single throw switch 12, a current loading transformer 14, an auto-transformer 16, a precision current transformer 18, a precision voltage transformer 20, a phase angle compensating transformer 22, a current selector switch 24, and a start-stop switch 26. A suitable source of three-phase commercially constant voltage 28 is required at the place of use of the testing apparatus. A single-phase watt-hour meter under test is shown at 30, and an alternating current rotating watt-hour meter standard is shown at 32. A voltage selector switch is shown at 94.

The three-phase supply 28 is illustrated as a delta connected transformer winding having the phase windings AB, BC, and CA, of equal voltages.

The current loading transformer 14 includes the primary winding 33 wound upon an iron core 34 and a plurality of distinct secondary windings 35, 36, 37, 38, and 39 wound upon the same core. The precision current transformer 18 includes a plurality of primary windings 40, 41, 42, 43, and 44 all wound upon a common core 45, upon which there is also wound a secondary winding 46. One end of winding 35 is joined directly to one end of winding 40 by a conductor 47 and one end of winding 39 is joined directly to one end of winding 44 by conductor 48. Winding 36 is joined to ends of windings 40 and 41 by conductors 49, 49', and 50; winding 37 is joined to ends of windings 41 and 42 by conductors 51 and 51', and conductor 52; winding 38 is joined to one end of winding 42 by conductors 53 and 53', and one end of winding 43 by conductor 54; and winding 39 is joined to one end of winding 43 by conductors 55 and 55', and to winding 44 by the conductor 48.

Switch 24 includes a manually rotatable contact 56 and a plurality of stationary contacts 57, 58, 59, 60, and 61.

A plurality of fixed resistors 62, 63, 64, 65, and 66 are provided. A conductor 67 extends from one end of resistor 62 and is joined to the conductors 49 and 49'. Similarly a series of conductors 68, 69, and 70, join resistors 63, 64, and 65 to conductors 51 and 51', 53 and 53', and 55 and 55' respectively. A conductor 71 joins resistor 66 to one end of winding 44; and a series of conductors join the other ends of resistors 62 to 66 to contacts 57 to 61 respectively as shown.

The conductors forming the windings 35 and 40, and the conductors 47, 49, and 67 are formed of one continuous wire having the capacity to carry all of the current carried by the largest current carrying meter to be tested by the apparatus, for example 50 amperes. The conductors forming the windings 36 and 41, with conductors 49', 50, 51, and 68 are also formed of one continuous wire having a current carrying capacity adequate to carry only the value of current next less than the largest value. In a similar manner each of the other paths are formed by one continuous conductor or wire of constant cross section. By using this arrangement many splices are avoided and considerable economy of labor is obtained.

The watt-hour meter under test includes a current coil 72 connected between the terminals 73 and 74 on the terminal block of the watt-hour meter 30. The loading transformer secondary winding 35 has one terminal 75 which is connected to watt-hour meter terminal 74 by a conductor 76 and conductor 77 having a plug connector 74a at the meter end thereof. Conductors 76 and 77 may be formed as one continuous cable. Watt-hour meter terminal 73 is connected to the manually rotatable contact 56 of switch 24 by a conductor 78 having a plug connector 73a at the meter end thereof.

The arrangement of windings and joining conductors in transformers 14 and 18 is such that, with switch arm 56 contacting contact 61, the magnetization produced by the current flowing in the windings of the closed circuit is additive in each of the cores. More specifically stated, the current flowing in windings 35, 36, 37, 38, and 39 at any instant magnetizes the core 34 in the same direction, and the current flowing in windings 40, 41, 42, 43, and 44 at any instant magnetizes core 45 in the same direction.

The terminals of winding 33 of transformer 14 are connected to two poles of switch 12 by conductors 79 and 80. Upon closing switch 12 the voltage from phase AB of the supply is applied to winding 33. The voltage of phase AB and the other phases is maintained at a constant value plus or minus two or three percent by suitable means not necessary here to describe.

Windings 35 and 40 and conductors 47, 49, 67, 67', 76, 77, and 78 are designed and constructed to carry the largest value of current which any watt-hour meter 30 to be tested on the apparatus is required to carry in service. Suppose this value to be one-hundred amperes. When this current is to pass through coil 72, the switch arm 56 is placed in contact with contact 57. Switch 12 is now closed and 100 amperes flows through winding 35, conductor 47, winding 40, along conductor 49 to and through conductor 67, resistor 62, contact 57, over contact arm 56, through conductor 78 to terminal 73, through meter coil 72 to and through conductor 77, and along conductor 76 to winding 35.

The value of the fixed resistance in resistor 62 is preselected to nicely determine the value of current flow in this circuit at the value of 100 amperes when the voltage AB is exactly of the predetermined constant value. The presence of this resistance also stabilizes the circuit so that small variations in the load circuit resistance between the switch terminal 57 and terminal 75 will have no appreciable effect on the value of the current flow. It will be appreciated that it is not of primary concern to maintain the current at any exact value because it is the purpose only to determine the accuracy of the watt-hour meter while it is carrying current in the orders of certain nominal values. In the case supposed the accuracy is desired to be determined while the load current remains at or in the vicinity of one hundred amperes. Slight variations in the supply voltage AB producing corresponding current fluctuations, in the vicinity of 100 amperes are of no consequence to the accuracy of the calibration.

It will be observed that when contact arm 56 is in contact with contact 57 no current flows in windings 36, 37, 38, 39, 41, 42, 43, and 44 and that only windings 35 and 40 carry current; also resistors 63, 64, 65, and 66 are excluded from carrying current.

Windings 36 and 41 may be designed to carry eighty amperes. When it is desired to determine the accuracy of a watt-hour meter 30 while it carries 80 amperes of current, the contact arm 56 is placed in contact with 58. Upon thereafter closing switch 12, voltage is generated in windings 35 and 36 causing a current of 80 amperes to flow in the circuit including winding 35, conductor 47, winding 40, conductors 49 and 49', winding 36, conductor 50, winding 41, along conductor 51 to and through conductor 68, resistor 63, contact 58, arm 56, conductor 76, meter coil 72, and conductors 77 and 76 to terminal 75 of winding 35.

It will be observed the resistors 62, 64, 65, and 66 are excluded from the circuit as are windings 37, 38, 39, 42, 43, and 44. Only resistor 63 is included of the various resistors, and this resistor has a preselected value of resistance sufficient to nicely determine the value of current flowing when it is connected in circuit, its value of resistance being independent of the value of resistance 62, as well as of resistances of resistors 64, 65, and 66. It will also be observed that windings 35 and 36 are both employed to generate the voltage necessary to drive 80 amperes through the watt-hour meter load circuit. Therefore winding 36 comprises only sufficient turns to, when added with winding 35, produce the necessary reduction of twenty amperes in current below the one hundred amperes supplied by winding 35 alone, while maintaining the same ampere-turn product.

By similar extensions the successive addition of windings 37, 38, and 39 in the same circuit successively reduces the fixed values of current supplied to a meter coil in the position of meter coil 72.

The purpose of the precision current transformer 18 is to, at all times, generate a current flow in the secondary winding 46 of a fixed nominal value, for example, five amperes, provided the nominal values of currents are properly applied to its primary winding or windings. This value of current is not exactly maintained nor need it be; but the departure of current value from five amperes is exactly maintained proportional to the departures from the various fixed nominal values of current flowing in the active windings of the windings 40, 41, 42, 43, and 44. Thus, when winding 40 carries 100 amperes precisely, winding 46 carries precisely 5.00 amperes; when winding 40 carries 98.00 amperes winding 46 carries $98/100$ of five amperes or 4.90 amperes. Again, when windings 40 and 41 carry precisely 80 amperes, winding 46 carries exactly 5 amperes; and when windings 40 and 41 carry 84 amperes winding 46 carries $84/80$ of five amperes or 5.25 amperes. In like manner, when all windings 40, 41, 42, 43, and 44 carry current, supposing the nominal value to be only ten amperes, the winding 46 carries the same nominal five amperes value as in the other cases, and the exact values fluctuate in exact linear proportion to the fluctuations in the ten ampere nominal current.

The construction of transformer 18 is such that the primary active ampere-turns is constant for all connections and the chosen values of current flowing. Thus: the number of turns in the respective windings 40, 41, 42, etc., may be indicated by the terms $N40$, $N41$, $N42$, $N43$, and $N44$. The currents required and produced by windings 35, windings 35 and 36 together; windings 35, 36, and 37 together; and so on; may be indicated by the terms $i1$, $i2$, $i3$, etc. Therefore, the product $N40$ by $i1$ equals the product ($N40$ plus $N41$) by $i2$ equals the product ($N40$ plus $N41$ plus $N42$) by $i3$; and so on, equals a constant. In addition the ratio of the number of active turns in the secondary of transformer 14 to the number of active turns in the primary of transformer 18 is preferred to be a constant less than unity; that is, $N35$ divided by $N40$ equals ($N35$ plus $N36$) divided by ($N40$ plus $N41$), etc., equals the constant less than one. This proportioning results in lowering the cost of the windings in transformer 14 as shown in Figure 1.

The voltage auto-transformer 16 comprises a core 81 upon which there is wound a single continuous winding 82 having end taps 83 and 84 and intermediate taps 85 and 86. Tap 85 is at the mid-point of winding 82 and tap 86 is at the quarter point.

The precision voltage transformer 20 comprises a core 87 having a primary winding 88 and a secondary winding 89. The primary winding 88 has mid- and quarter-point taps 90 and 91 corresponding to those of the transformer winding 82, and end taps 92 and 93.

The switch 94 is provided to have a manually rotatable bridging contact 95 adapted to connect the contacts of pairs of contacts 96 and 97, 98 and 99, and 100 and 101. Contact 96 is connected to tap 84, contact 100 is connected to tap 85, and contact 98 is connected to tap 86. Contacts 99, 101, and 97 are connected to taps 92, 90 and 91 of windings 88. It will be seen that the rotatable contact arm 95 connects pairs of contacts on the two transformer windings having like active portions of the total numbers of turns of the two windings. As shown, arm 95 connects the quarter taps of the two windings.

A conductor 102 connected to a conductor 103 joins tap 85 of winding 82 to conductor 89; and conductors 104, 105, and 106 join the end terminal 83 of winding 82 to the conductor 79. The voltage of the phase AB of the supply is thus applied to the winding 82 at the end terminal 83 and the mid-point 85. The voltages available from transformer 16 are, therefore, one-half of the voltage AB (available between terminals 83 and 96); all of voltage AB (between terminals 83 and 100); and twice the voltage AB (across 83 and 98).

The watt-hour meter under test comprises a voltage coil 107 having conductors 108 and 109 extending to terminals 74 and 110 on the meter block. The voltage required to operate meter 30 depends upon the consumer voltage for which the meter is intended. It is assumed that the meter 30 is designed for a voltage equal to half the voltage of phase AB in making the connections in the drawing.

A conductor 111 extends from arm 95 of switch 94 to conductor 77 and is therefore connected through conductor 77, terminal 74 and conductor 108 to one end of the voltage coil 107; and a second conductor 112 is connected from terminal 110 to conductor 106, being thereby connected along conductors 104 and 105 to the terminal 83 of winding 82.

It is accordingly evident that the voltage existing between terminal 83 and tap 86 is transmitted to the voltage coil 107 over the circuit from 86, contact 96, arm 95, conductor 111, conductor 77, terminal 74, conductor 108, voltage coil 107, terminal 110, conductor 112, conductors 105 and 104 to terminal 83.

If meter 30 is of the same voltage rating as the voltage of phase AB, the arm 95 would be moved to contact 100 to apply the voltage AB to coil 107; and if the meter 30 is rated at double the voltage AB, arm 95 is moved to contact 98. These values correspond to general standard nominal electricity distribution values of 110, 220, and 440 volts.

The same voltage which is applied to the voltage coil of meter 30 is also applied to a corresponding tap of the primary winding 88 of transformer 20. For this purpose, the terminal tap 93 of winding 89 is connected to conductors 104 and 105 and the remaining connection to winding 88 is effected by contact arm 95 of switch 94. The current flow in the disposition shown is from tap 86 of transformer 16 to contact 96, over arm 95 to contact 97, through quarter tap 91 through the quarter section of turns to tap 93, thence along conductor 104 to terminal 83.

Assume for present purposes of general explanation that transformer 20 is, in itself, made to generate a secondary voltage bearing the same phase relation to the current in winding 46 as the voltage applied to coil 107 bears to the current in coil 72, and that, therefore, transformer 22 is omitted. Under these circumstances transformers 16 and 20 are so constructed that when the voltage AB is constant, the voltage induced in the secondary 89 of transformer 20 is a constant irrespective of the position of switch arm 95. This voltage of winding 89 is made to agree with the standard voltage for which watt-hour meter standards are constructed. Such standards are provided with voltage coils designed to operate accurately at a nominal value of 110 volts. Accordingly transformer 20 is designed to generate 110 volts in winding 89 for each of the voltages applied from switch 94, and this voltage is, by this invention, made to have the same phase relation to the current flowing in 46 as the voltage applied to 107 has to the current in 72, either by proper design of the transformer 20 itself, or by the addition of transformer 22 later to be described.

Thus, when exactly 110 volts appear between terminal 83 and tap 86 of transformer 16 with switch 95 in the position shown, exactly 110 volts are applied to taps 91 and 93 of winding 88, and exactly this same value of voltage appears at the terminals of the rotating standard when connected. To produce 110 volts between 83 and 86, the voltage at AB is 220 volts. Assuming voltage AB remains at 220 volts and switch arm 95 is in a position joining 85 and 101, it is evident that 220 volts are now applied to taps 90 and 93 of winding 88. The voltage induced in winding 89 is exactly 110 volts, or one half the voltage applied to taps 90 and 93 of winding 88. Again assuming that the voltage AB remains at 220 volts with switch arm 95 in a position joining contacts 98 and 99, it is evident that the voltage between the ends 83 and 84 of winding 82 is twice the value of the AB volts or 440 volts. Thus 440 volts are applied across the ends of winding 88, the voltage induced in winding 89 being exactly one-quarter of this value or 110 volts.

It is therefore evident that irrespective of which one of the nominal values of voltage there is applied to coil 107 of meter 30 by selection of the proper tap contact 96, 98, or 100, the voltage generated in winding 89 remains of the same order, or as instanced, about 110 volts. That the proper connections are made is insured by making bridging arm 95 of a rigid character.

In this way it is impossible to connect the tap 84 to tap 91 and thus to apply an excessive voltage to the winding 116, which if it were done might destroy the windings in the secondary circuit. It is important to observe that fluctuations in the voltage AB produce corresponding fluctuations in the voltages applied to coil 107 and generated in winding 89. The fluctuations in these applied and generated voltages are at all times proportional to each other. These fluctuations produce no errors in the accuracy of the apparatus so long as the voltages lie within the permissible range of operation of meters 30 and the standard meter 32.

The watt-hour meter standard 32 comprises a current coil 115, a voltage coil 116, an induction rotor 117, and a suitable register scale 32a with a pointer 32b for registering the rotations of rotor 117 to the nearest one-hundreth of a revolution, a revolution counter register 32c being also provided.

The current coil 115 of the standard meter 32 is connected in series with the winding 46 of current transformer 18 by conductors 117 and 118. The potential coil 116 is connectable in series with the winding 89 of the voltage transformer 20 by hand operated push button 26 through conductors 119, 120, 121, 122, 123, and the secondary winding 126 of the phase angle compensating transformer 22.

The compensating transformer 22 comprises a primary winding 124, a core 125, and a secondary winding 126. One end of the winding 124 is connected to conductor 80 by a conductor 127 extending from conductor 103. The other end of winding 124 is connected to the middle pole of switch 12 over a conductor 128 and is connectable to terminal C of supply 28. Accordingly the voltage applied to winding 126 is phase displaced with respect to the voltage generated in winding 89 by sixty electrical degrees. The ratio of secondary turns to primary turns in transformer 22 is very small so that the secondary voltage is very small in ratio to the primary yet nominally constant. The corresponding instantaneous values of the voltages of 89 and 126 are adjusted so that the voltage between 119 and 120 equals the rated value of the voltage for coil 116, the voltage AB being double this value. This adjustment includes choosing a ratio between the voltages of 89 and 126 such that the resultant voltage of 126 and 89 occur in the same phase relation to the current in coil 115 as the phase relation between the voltage in coil 107 and the current in coil 72. When the current in coil 72 can be regarded as being in phase with the voltage in coil 107 the voltage between 119 and 120 is adjusted until it is in phase with the current in coil 115. Once adjusted, the required relationship is permanent.

By this construction the voltage applied to meter coil 116 and the current passing through meter coil 115 are caused to be in proper phase relation. Accordingly all watt-hour meter standards 32 having the same voltage and current coil ratings are interchangeable in the apparatus because no alterations in their lag coil is required to adapt them for use with the testing apparatus.

*Arrangement of current transformers*

Figure 2:
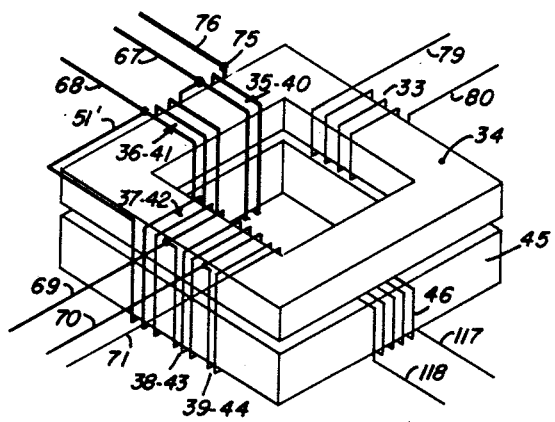
Fig. 2 is an isometric diagram of the manner of winding certain components according to one modification.

An important advantage of arranging the circuit so that the windings 35 and 40 may be formed by one continuous conductor is that the winding may be consolidated into one winding embracing two cores. Referring to Fig. 2, the windings 33 and 46 are first wound on the cores 34 and 45 while the cores are separated. The assemblies are then brought together and wound with the windings 35—40 (being a consolidation of windings 35 and 40) by passing each turn of the conductor around both cores 34 and 45. The winding on both cores is the same in this case. The windings 36—41, 37—42, etc., are effected in a similar manner.

By this construction much less winding effort is required and considerable space is saved because portions of windings otherwise between the cores are eliminated and the cores are positionable closer together.

The arrangements of Figures 1 and 2 are as applicable in the testing of power instruments as they are in the testing of energy instruments. Watt-meters are substituted for the watt-hour meters.

*Apparatus for testing two-wire energy meters and three-wire energy meters in alternation*

Figure 3:
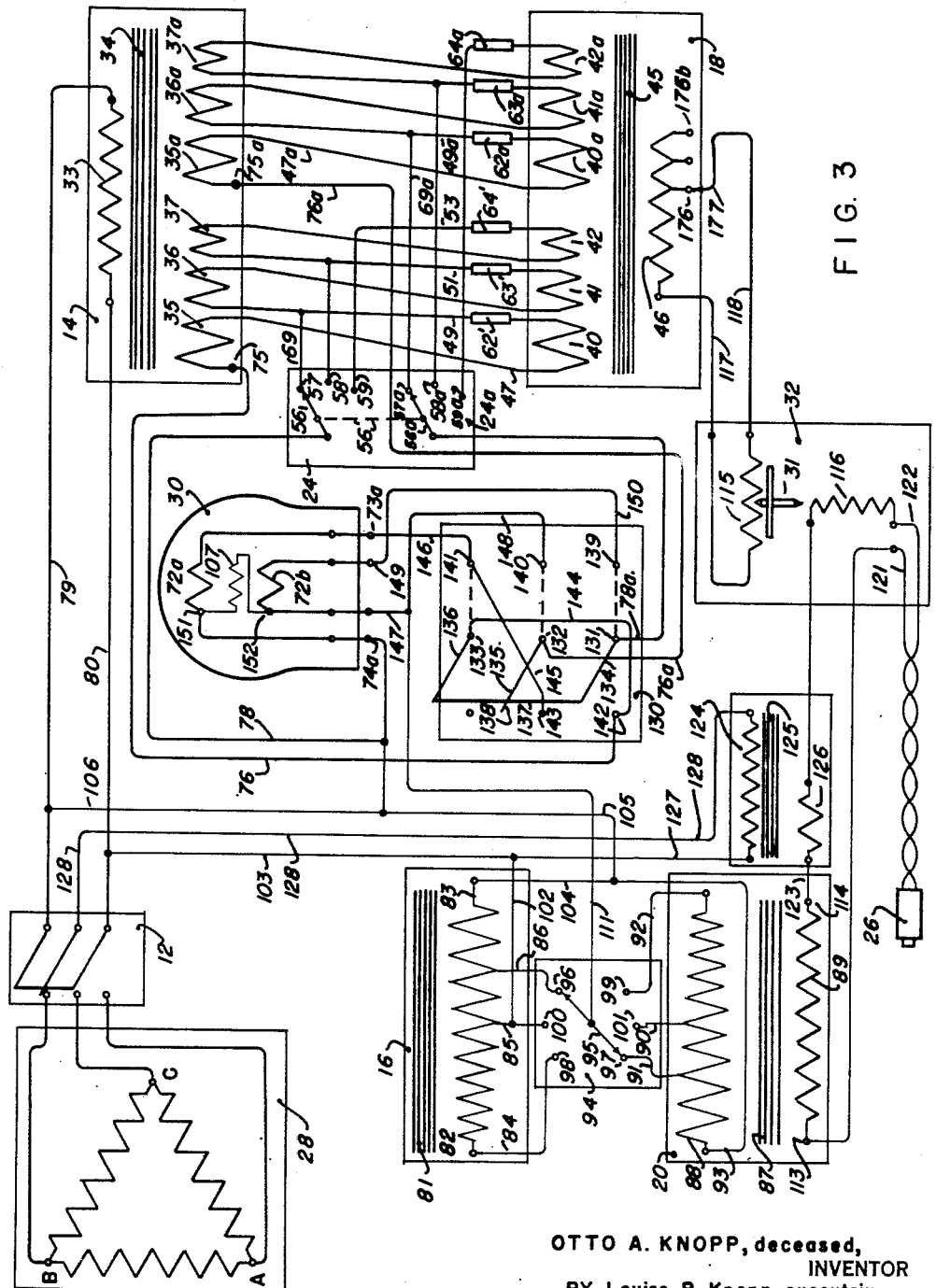
Fig. 3 is a diagram showing the invention as applied in the testing of two- or three-wire watt-hour meters.
Figure 4:
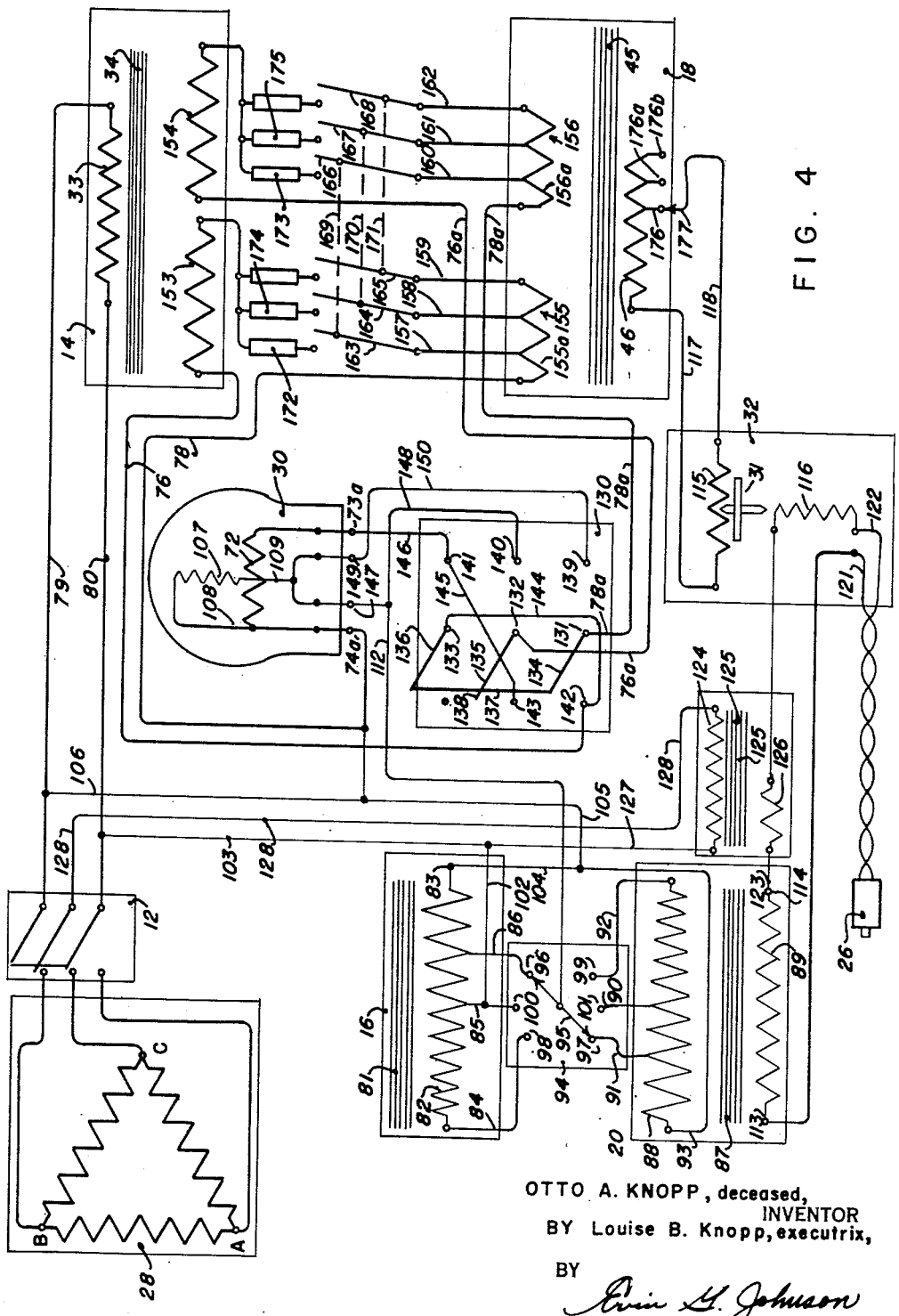
Fig. 4 is a diagram similar to Fig. 3 showing another arrangement of apparatus for the same testing pupposes.

In Figs. 3 and 4 of the drawings there is shown apparatus for testing either two-wire or three-wire watt-hour meters at the different values of voltage and current of circuits for which the different meters of this type are generally provided to meter. The arrangements in these two figures are generally similar to that of Fig. 1, being for testing the same meters as that apparatus and, in addition, meters having two current coils.

Referring now to Fig. 3, the apparatus includes an additional switch 130 for choosing an arrangement of apparatus in a circuit appropriate to the type of meter, whether two-wire or three-wire. Also included is an additional set of windings 35a, 36a, and 37a; and 40a, 41a, and 42a, corresponding to and identical with windings 35, 36, 37; and 40, 41, and 42. (Windings 38, 39, 43, and 44 have been omitted from this illustration for the sake of simplicity. The number of such windings in each set depends upon the number of different values of load current required to accommodate all meters; and the number of sets required depends upon the number of separate coils likely to be encountered in the meters, as two coils in the three-wire meter.)

The set of windings 35a, 36a, and 37a is shown wound on the same core 34 as the set of windings 35, 36, and 37. The set of windings 40a, 41a, and 42a is shown wound on core 45 with windings 40, 41 and 42. Separate cores can be employed for each set with required corresponding windings 33 and 46.

An additional switch 24a is provided similar to switch 24, having movable contact arm 56a and stationary contacts 57a, 58a, and 59a. The switch arms 56a and 56 are mechanically linked by a link 56' so that they always contact corresponding stationary contacts, and therefore that corresponding groups of windings of each set of windings are active.

The switch 130 comprises: three central terminals 131, 132, and 133 to which there are pivoted knife-blades 134, 135, and 136 joined by an insulating bar 137 for operation by a handle 138; three stationary contact terminals 139, 140, and 141, for simultaneously receiving the blades 134, 135, and 136 in one position of the blades; and two stationary contact terminals 142 and 143 for simultaneously receiving the blades 134 and 135 in another position of the blades. Terminals 133 and 142 are permanently joined by a conductor 144, and terminals 141 and 143 are permanently joined by a conductor 145.

Conductor 76 is connected to terminal 142; and conductor 78 is connected to meter clip 74a. Conductor 76a is connected to terminal 132, and conductor 78a is connected to terminal 131. Terminal 141 is also permanently connected to meter clip 73a by conductor 146; terminal 140 is permanently connected to meter clip 147 by a conductor 148; and terminal 139 is permanently connected to a meter clip 149 by a conductor 150.

The potential from the voltage transformer 16 is applied to meter clips 74a and 147 over conductors 105 and 111.

Resistors 62', 63' and 64'; and resistors 62a, 63a, and 64a corresponding respectively to resistors 62, 63, and 64 are employed. These resistors are, however, differently connected than resistors 62, 63, and 64. Resistor 62' is connected between conductor 49 and winding 40 so that for all positions of switch arm 56 resistor 62' is in circuit. Resistor 63' is connected between conductor 51 and winding 41 so that when switch arm 56 contacts 58, resistors 62' and 63' are in series. Therefore resistor 62' is effective at all positions of arm 56 and resistor 63' is to be regarded as having a resistance equal to the value of resistance of 63 less that of 62. Similarly the resistance of 64' is equal to the value of resistance in 64 less the resistance values of 63 and 62.

As shown in Figure 3 the apparatus has applied thereto for testing a three-wire meter 30 having current coils 72a and 72b. To effect this test the blades of switch 130 are moved to contact terminals 139, 140, and 141, so that the current coil 72a receives its current from one or more windings of the set of windings 35, 36, and 37; while current coil 72b receives its current from one or more of the set of windings 35a, 36a, and 37a. The circuit as shown for coil 72a is from terminal 75 of winding 35, conductor 76, terminal 142, conductor 144, terminal 133, blade 136, terminal 141, conductor 146, coil 72a, conductor 78, switch arm 56, conductors 69 and 49, resistor 62', winding 40, and conductor 47 to the other end of winding 35. The circuit for coil 72b at the same time is from terminal 75a of winding 35a, conductor 76a, blade 135, conductor 148, coil 72b, conductor 150, blade 134, conductor 78a, switch arm 56a, conductors 69a and 49a, resistor 62a, winding 40a, conductor 47a, to the other end of winding 35a. The currents generated in windings 35 and 35a are equal and in phase but are distinct. No current from either of these windings can pass through potential coil 107, and the only path for the voltage current across conductors 105 and 111 is through coil 107. The potential coil 107 remains permanently connected to coils 72a and 72b at 151 and 152.

When a two wire watt-hour meter is applied to the apparatus by clips 74a, 147, and 73a, the same value of current that previously flowed in separate circuits including coils 72a and 72b, is made to flow in one circuit including all windings 35, 40, 35a, and 40a and coil 72 by reversing switch 130. In Fig. 3 the circuit is from terminal 75, conductor 76, blade 134, terminal 131, conductor 78a, switch arm 56a, conductor 69a, resistor 62a, winding 40a, winding 35a, conductor 76a, terminal 132, blade 135, conductors 145, 146, clip 73a, through coil 72a, clip 74a, conductor 78, switch arm 56, conductors 69 and 49, resistor 62', winding 40, conductor 47, and through winding 35 to terminal 75. Windings 35 and 35a are therefore in additive series and, the turns in series being double those in parallel, the current is the same as in each case in parallel.

The current generated in winding 46 is the same in each case (of three and two-wire meters tests) and the standard 32 registers the energy as that which ought to be registered by meter 30.

In Fig. 4 the secondaries of transformer 14 and the primaries of transformer 18 are altered from those of Fig. 3 and Fig. 1. They function with respect to external circuits or a circuit joined thereto by conductors 76 and 78, and conductors 76a and 78a, in a way similar to that of the corresponding windings of Fig. 3. One winding 153 replaces windings 35, 36, and 37; and one winding 154 replaces windings 35a, 36a, and 37a. One winding 155 replaces windings 40, 41, and 42; and one winding 156 replaces windings 40a, 41a, and 42a.

Windings 155 and 156 are provided with taps 157, 158, and 159 extending respectively to switch arms 163, 164, and 165; and taps 160, 161, and 162 extending respectively to switch arms 166, 167, and 168. A pair of switch arms 163 and 166 is mechanically linked together with link 169 to open and close simultaneously. Pairs of switch arms 164 and 167, and 165 and 168, are similarly linked by links 170 and 171.

Switch 163 when closed connects a resistor 172 in series with all of the windings of transformer 153, the external circuit of conductors 76 and 78, and a section 155a of winding 155. A similar circuit is closed by switch 166 to conductors 76a and 78a. The resistors 172 and 173 are selected to determine the exact current required for this closure and in combination act to prevent unbalance of currents from equality when operating in parallel. The active turns of windings 155 and 156 are such as to produce a constant value of ampere turns on core 45 as in other cases. Switches 164 and 167 when closed connect resistors 174 and 175 in series with windings 153 and 154, and make additional turns of windings 155 and 156 active, the value of current now flowing being a second required value and the turns active in 155 and 156 being such as to produce the same ampere turns as before.

The apparatus of Fig. 4 is shown as having a two-wire watt-hour meter connected for test. The dotted line positions of switch blades 134 and 135 and switch arms 165 and 168 indicate an active circuit including all of the windings 153, 154, 155, and 156 in series with coil 72.

*Adjustment for testing watt-hour meters having different watt-hour constants*

The apparatus as thus far described applies when all watt-hour meters to be tested are designed to have the same watt-hour constant as the standard 32. By the watt-hour constant is meant the number of watt-hours required to produce exactly one rotation of the disc. The watt-hour constants of meters of some manufacturers are different from each other and from those generally adopted as standard by the industry. This constant is expressed on the nameplate of the meter. Unless special provision is made for the purpose of its avoidance, the testing of a meter 30 having a different watt-hour constant than that of standard 32 involves the arithmetical calculation of the reading which the standard ought to indicate when meter 30 has made a pre-determined number of revolutions; and the standard does not directly indicate the true error and correction factor of the meter 30 when it has rotated such a number of revolutions so calculated because the revolutions so calculated may involve a fraction of a revolution, and so on additional calculation has to be made to determine the percent error.

In order to cause standard 32 to indicate percent error directly in cases of all watt-hour constants, the winding 46 has taps 176, 176a, 176b, etc., thereon which corresponds to the values of the particular watt-hour constants.

If the watt-hour constant of meter 30 exceeds that of standard 32 more turns are required in winding 30 than when the constants are equal; and when the constant of meter 30 is less than that of standard 32, fewer turns are required in winding 46. By selecting a number of turns in 46 such that with a correct meter 30 having a certain constant other than that of standard 32, the rotations of standard 32 and the meter 30 are in a ratio of 1:1, 1:10, or 1:100, the ratio of the reading of the standard to the particular meter under test can be read off directly for any watt-hour constant. Contact 175 might be for a constant of ⅓ kwh. per rotation; contact 176a for a constant of ⅔ kwh. per rotation; and contact 176b might be for a constant of ⅘ kwh. per rotation. A switch arm 177 is manually settable to the proper contacts 176, 176a and 176b. Markings K1, K2, and K3 are indicative of the value of the constants placed to register with the switch arm 177 when the correct contact is made for a particular meter.

*Comparison or resistor's functions*

The showing of resistors 62, 63, 64, 65, and 66 in Fig. 1 is for the purpose of illustrating an alternative location for the resistors 62', 63', 64', and 62a, 63a, and 64a in the apparatus of Fig. 3. When the apparatus of Fig. 1 is employed for testing two-wire watt-hour meters, the resistors may be omitted, though their presence is permissible.

In the apparatus of Figs. 3 and 4 however, it is preferable to employ resistors at one of the locations shown because of the special conditions which may develop in testing three-wire energy meters and which is that, referring to Fig. 3, should one of the circuits including one of the coils 72a or 72b develop a higher impedance than the other, the currents in the two circuits would to a like extent unbalance in the absence of these resistors in each circuit. The condition could occur if one of the windings 72a and 72b were open circuited or had a shorted turn. In the absence of the resistors the sums of the currents in the two circuits tend to be the same as when the circuit impedances are balanced. Accordingly one circuit may carry nearly all the current otherwise expectable to be evenly divided, and the meter under test may register very nearly as if it were correct. The secondary winding resistors cause the secondary windings to deliver current in accordance with their internal fixed impedances so that if an unusual condition of high impedance in one coil of a meter exists it promptly fails to register anywhere near accurately, the current in the other coil circuit being not permitted to increase beyond the rated value appreciably.

*Calibration of current standards*

The arrangements of the windings and circuits of transformers 14 and 18 are also applicable in the calibration of current measuring devices such as ammeters and instrument current transformers. The transformer 18 in each case functions as a multiple range precision current transformer and the transformer 14 with switch 24 provide for imposition of various values of load current to the ammeter, or current transformer and meter, under test in place of the current coil 72 of meter 30.

Figure 5:
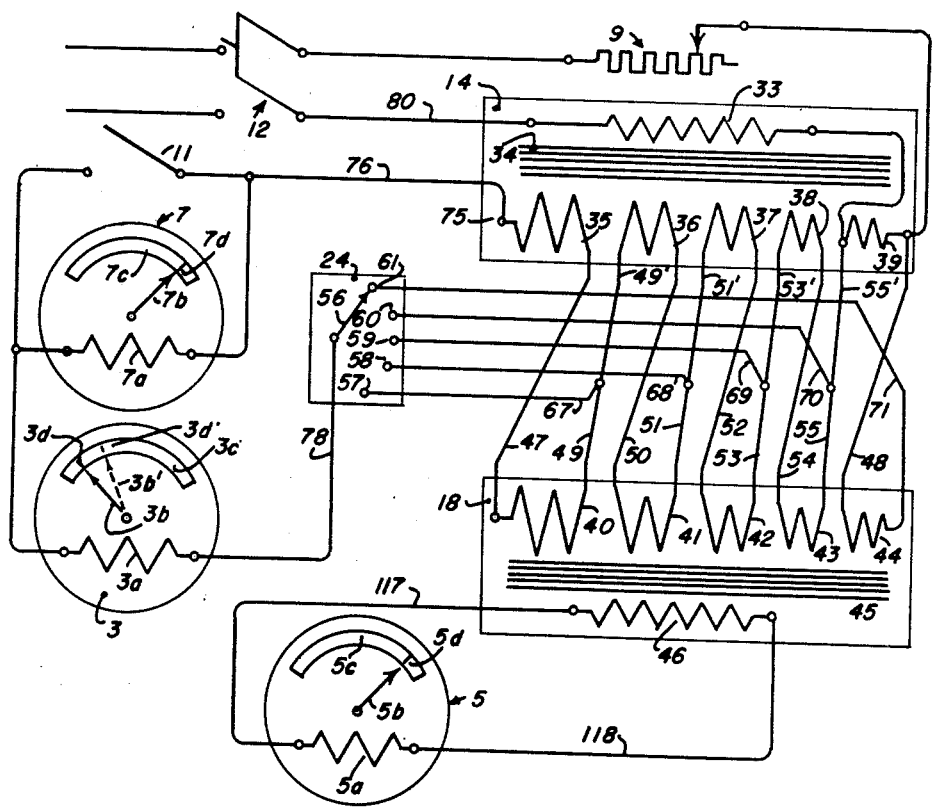
Fig. 5 is a diagram showing the invention as applied to the calibration of current measuring instruments.

Referring particularly to Fig. 5 the apparatus is shown connected for calibrating an ammeter 3 having a current coil 3a. An ammeter 7 is provided having an indicator pointer 7b. The meter 7 needs to be in calibration as to only one scale marking 7d on its scale 7c, which indicates accurately a value of current corresponding to current from one of the groupings of windings 35 to 39, as given by contact arm 56. This value of current will be an integer value, such as 50.00 amperes.

An ammeter 5 having a coil 5a, a pointer 5b, and scale 5c is also used. Ammeter 5 need only have good repeating accuracy, that is, for each passage of a precisely fixed value of current its pointer 5b assumes exactly the same scale position; for example the position in registry with scale marking 5d. A rheostat 9 is used in the supply line 79; and a shunt switch 11 is provided for meter 7.

In operation the switch arm 56 is positioned on one of the contacts 57—61 to provide approximately the current corresponding to the value indicated by marking 7d of meter 7. Switch 11 is open. Switch 12 is now closed and current flows thru meter 5. Rheostat 9 is now adjusted until pointer 7b precisely registers with scale mark 7d. A mark 3d can now be made on scale 3c of meter 3 showing the position of pointer 3b for this value of current. Meter 5 is now precisely read at its corresponding position 5d of scale 5c; this reading being one to be maintained for further calibration points.

With switch 11 closed and switch 12 open, contact 56 is placed on contact 60 and switch 12 is reclosed. Rheostat 9 is now adjusted if necessary until the pointer 5b registers with scale mark 5d. This indicates that a current having a value which is precisely a known multiple of its value is flowing through meter coil 3a. (The multiple is given by the transformer ratio at the value of secondary current indicated by mark 5d, which ratio is a whole number, made so by design.) The pointer 3b has now the position 3b', shown dotted, and the mark 3d' is provided on scale 3c to indicate the value of current. By a similar procedure several markings of scale 3c may be effected corresponding to the number of windings 35—49. It will be observed that the range of current meter 3 may be several times that of the current meter 7 as is indicated by the showing of scale mark 7d near the upper part of the scale, while pointer 3b is near the zero of scale 3c and transformer 14 is supplying a minimum value of current through switch arm 56.

One of the features of this invention is that the winding of transformer winding 33 is reduced substantially in its number of turns by employing one of its secondary windings, as winding 39, in series with it in the supply circuit. Only one of these secondary windings may be so used as more than one so connected would improperly include one or more of the primary windings of transformer 18.

While Fig. 1 shows no rheostat corresponding to rheostat 9 in Fig. 5, it is to be observed that close regulation of the calibrating current in Fig. 5 is required and that this can be effected by rheostat 9. In Fig. 1, however, since voltage AB is nearly constant, the nominal values of currents required for energy meter testing are within sufficiently close limits to serve without a special rheostat such as rheostat 9.

*Apparatus for observing standard and meter under test*

Figure 6:
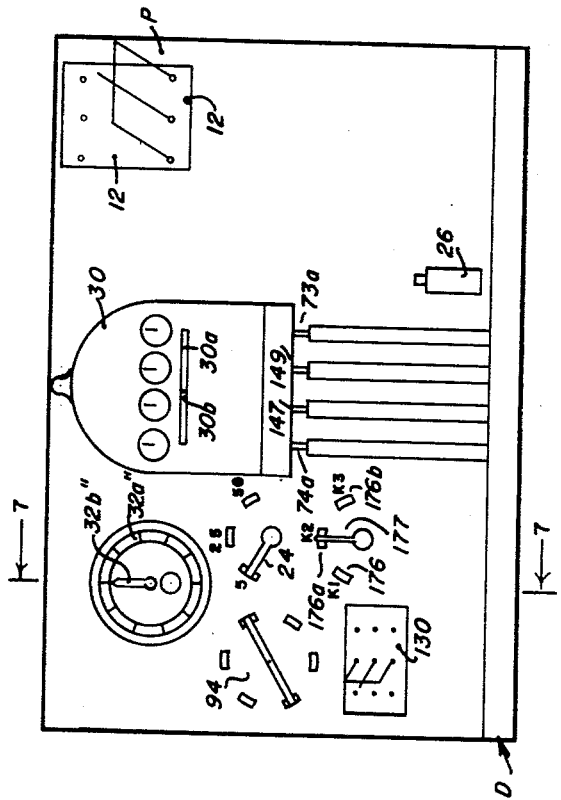
Fig. 6 is a fragmentary front view of a test board.
Figure 7:
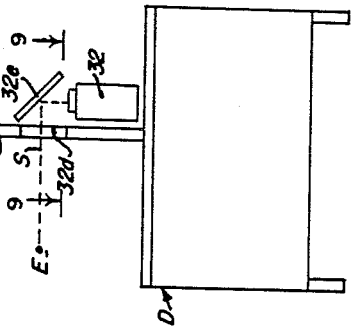
Fig. 7 is a diagrammatic section at line 7—7 of Fig. 6.

The entire testing apparatus for energy meters is centered in a test bench illustrated generally in Figs. 6 and 7, in which figures only certain details are specifically illustrated. The test bench comprises a desk D upon which there is mounted a panel-board P. A meter 30 to be tested is mounted on the center of the board for ready vision by the operator. The rotating standard which heretofore has been mounted in the desk or table so that the operator could look down upon it, is by this invention, mounted as in Fig. 2, with its dial in a horizontal position but behind the panel. A reflecting mirror 32e is mounted on the rear of the panel and a window 32d through the panel is provided opposite the mirror. It will be observed that the window and the meter 30 are in the same field of view so that the operator can see both without losing count of the revolutions of meter 30. The space in front of the panel is usable for meters to be tested.

Figure 8:
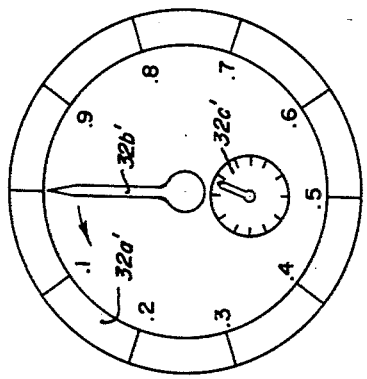
Fig. 8 is an enlarged view of the face of the rotating standard meter as seen from the front of the test board.

The appearance of the face of a standard watthour meter is shown in Fig. 8. It has an indicator hand 32b' and a scale 32a'. The scale of values increases in the counterclockwise direction, and the indicator hand rotates counterclockwise.

In order to see the face of standard 32 as if it were in a plane parallel to the of meter 30 as shown in Fig. 6, the mirror 32e is mounted above the face at an angle of about 45° to the line of sight S from a point E in front of panel P.

Figure 9:
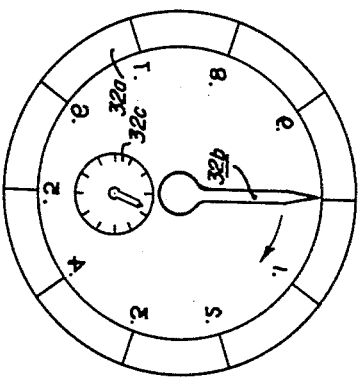
Fig. 9 is a view of the face of the standard as seen from line 9—9 of Fig. 7.

In order to overcome the mirror effect and to make the image of the face of meter 32 appear identical with the appearance of the normal face of a rotating standard, and that the rotating standard be accurate nevertheless, the following modifications are made in the standard so that it can be read by a mirror: A photographic negative is made of the face of the rotating standard and a reversed positive print as shown in Fig. 9 is made from the negative. This print is installed to replace the dial of the rotating standard. The direction of rotation of the rotating standard is reversed to cause the indicating pointer 32b to rotate clockwise as shown in Fig. 9, instead of counterclockwise. The standard 32 is mounted with the zero indication toward the front of the desk to appear when looked down upon as shown in Fig. 9. The frictional adjustment of the standard is caused to operate in the proper direction. In this way the standard 32 is made to appear through the window in Fig. 8, that is, as a normal standard.

*General operation of energy meter test apparatus*

In operation, referring to Fig. 3, the switch 12 being open the meter 30 to be tested is connected to the clips 74a, 147, 149, and 73a. Its character as a two or three wire meter is determined and switch 130 positioned accordingly. Its voltage rating is ascertained and switch 94 is set for that voltage. Its rated load current is ascertained and switches 24 and 24a are positioned accordingly. Switch 12 is now closed. This starts meter 30 running. Each rotor of meter 30 has a mark 30b on its periphery which in rotation periodically becomes visible and enables counting the meter rotations. As the mark of the disc passes a fixed point in sight of the operator he closes switch 26. This starts standard 32 from a zero position of registration. The operator notes the fact of movement in pointer 32b of standard 32 and counts the revolutions of meter 30 up to a fixed number and stops the standard as disc 30a completes such number of revolutions, such as ten, by opening switch 26. The standard should have rotated exactly one revolution if meter 30 were correct, but the number of hundredths of a revolution less or more than one revolution is the percent error while the reading is the correction factor. Thus, if the reading of the standard is .98 rotation, the error is 2% over, and the readings of the meter under test should be multiplied by .98 to arrive at the correct value of registration. To test the meter 30 at 10% of its rated load, it is permitted to run around once, during which time the standard will run through ten revolutions more or less, and the deviation from a complete rotation in hundredths is divided by ten to arrive at the error and the reading is divided by 10 to obtain the correction factor.

When meters have been properly segregated so that all of identical ratings have sequential testing, only one setting of the various switches is required for each group and considerable speed is obtained.

What is claimed is:

1. In combination, a source of alternating current and voltage, means including an instrument transformer connected to said source having windings providing a plurality of ranges wherein the operative turns-ratio product is the same for all ranges and wherein the phase angle between primary current and secondary current is the same for all ranges; means, including a voltage transformer, designed to operate at constant voltage output connected to receive input voltage from said source in proportion to the voltage of said source and when receiving energy from said source having a significant phase angle of its output voltage with respect to the secondary current of said current transformer, and a second source of alternating current voltage having a fixed phase displacement of its voltage with respect to the voltage of the first source of energy and a fixed proportional voltage relation to the magnitude of the voltage of the first source connected to the voltage transformer to provide a shift in phase angle between the outputs of the current and voltage transformers.

2. In combination, a source of alternating current and voltage, apparatus for translating several values of alternating load current from said source to a load circuit in substantially the same phase relation, means energized from the source for translating therefrom an alternating voltage, indicating means reacting to the joint effects of said translated load currents and voltages, said apparatus being constructed and arranged so that the phase angle between the translated voltages and currents is the same for each of several values of load current, a second source of alternating current having a fixed phase displacement with respect to the first mentioned source, and means for applying current from the second source to the instrument in a manner to adjust the phase relation of the load current and voltage.

3. A watt-hour meter testing apparatus comprising, in combination: a watt-hour meter standard, a source of polyphase energy, voltage and current transformer apparatus for translating the voltage and current from one phase of said supply to values correct for application to a watt-hour meter under test; voltage and current transformer apparatus for translating voltage and current as applied to the meter under test to values of voltage and current of like order in all cases for application to the watt-hour meter standard, and means for translating voltage from another source of the supply into the voltage circuit of the standard to cause the phase relations in the standard meter to agree with the phase relation between voltage and current in the meter under test.

4. In testing apparatus adapted to test watt-hour meters of different voltage and different current ratings from a single source of energy without the expenditure of energy equal to the energy expended in circuits normally metered and by the aid of a single meter standard; transformer means for applying currents translated from the source in predetermined amounts to the meter under test and transformer means for translating all values of the applied currents to a constant nominal translated value for application to the standard meter; transformer means for applying voltages translated from the source in predetermined values to the meter under test; and transformer means for translating all values of the applied voltages to the standard meter in substantially the same phase relation with the standard meter current as the corresponding phase relation existing in the meter under test.

5. An electrical apparatus for comparing electrical instruments having different current carrying capacities with a standard instrument having precision in the immediate vicinity of a single value of current providing, in combination: a loading transformer core, a single supply circuit winding on said loading transformer core; an instrument transformer core, a single winding on said instrument transformer core for connection to the standard instrument; a plurality of windings on the cores, each winding being formed by a continuous conductor wound around the cores; the ends of the continuous windings being connected together and having tap conductors extending from the ends of the windings; a circuit providing means for connecting the current coils of a compared instrument therein, and a switch having a movable contact permanently connected in said circuit and arranged for connection to any of said taps.

6. In electrical testing apparatus for the alternative testing of meters having different numbers of torque producing coils at various values of current, in combination: means for indicating the true effects of such currents including a measuring instrument and transformer windings in circuit; an energy supply circuit including transformer winding and an alternating current source; transformer core structure linked with the supply circuit windings; meter loading circuits including windings linking said core structure, a selector switch, and meter connections; the arrangement being such that the same current may be caused to flow through said windings and a meter connected by said connections, or separate currents equal to said same current may be caused to flow through said windings and a connected meter.

7. A method of testing meters having current coils and a voltage coil with its ends electroconductively connected to the current coils without disconnecting the voltage coil from either current coil which comprises supplying testing currents to all of the current coils from distinct energizing circuits.

8. Electrical apparatus comprising means for transforming alternating current energy including windings, each of a plurality of said windings having equal transformation characteristics, means providing for the connecting of a plurality of windings to form either a single circuit or distinct circuits, a circuit including current responsive means and windings related to said plurality of windings and said current responsive means to produce substantially the same effect in said current responsive means when the plurality of windings are included in either one or more circuits.

9. Means for energizing one or two current carrying circuit components alternatively comprising two sources of current, connector means for receiving such components, plural position switching means, and means connecting the sources of current, the switching means and the connector means arranged to connect one component in series with the two sources while the switch is in one position and arranged to connect two components in separate circuits with the two sources while the switch is in another of its positions.

10. Apparatus for loading current coils of two or three wire watt-hour meters alternatively comprising a transformer having two sets of loading transformer windings, means for applying current from the windings to one load or to two separate loads, and resistors individual to each set of windings in circuit with the active windings and separate loads when so applied.

11. Electrical alternating current apparatus for the testing of alternating current induction watt-hour meters and the like, wherein the method of operation includes the comparison of the number of rotations of the meter disc with the concurrent registration of a standard meter, the disc rotations of the standard being so chosen with respect to the watt-hour constant of the meter under test that the meter correction or error is indicated by the standard meter directly or as a decimal multiple of the meter error when a fixed number of rotations of the meter under test have occurred, said testing apparatus including means for loading the meter under test at various loads, and means for energizing the standard meter to indicate said loads including a transformer winding, and means providing for direct indication of errors of watt-hour meters having different values of the watt-hour constant by said standard comprising several taps on said transformer winding chosen to effect a decimal multiple of the number of rotations of the standard disc while one rotation of the meter under test occurs provided the meter under test is correct.

12. An electrical apparatus for comparing electrical instruments having different current carrying capacities with a standard instrument having precision in the immediate vicinity of a single value of current providing, in combination: a loading transformer core, a single supply circuit winding on said core; an instrument transformer core, a single winding on said instrument transformer core for connection to the standard instrument; a plurality of windings on the cores, each winding being formed by a continuous conductor wound round the cores; and means for connecting any of the windings in circuit with the electrical instruments to be tested according to their current carrying capacities.

13. Apparatus for testing meters having different numbers of coils comprising: a set of contact clips such that all meters may be received by such clips, a plurality of sources of testing current such that each coil is individually assignable to a designated individual source, a multiple circuit multiple position circuit controller including several terminals and corresponding movable contacts, and a plurality of conductors joining terminals of the clips, source and controller; the arrangement and connections being such and so related that in a certain position of said controller a plurality of sources of current are connected in one circuit and that when said controller is in another position the switches thereof connect one of the sources in a separate circuit from the circuit of another source.

14. Apparatus for testing energy meters having two current coils and a potential coil normally connected to the current coils within the meter enclosure with the terminals of the potential coil remaining connected to the current coils during the test, said apparatus comprising a loading transformer having two secondary windings, and means providing distinct current paths for conducting current from the secondary windings to the respective coils of the meter.

15. Apparatus for testing energy meters having two current coils and a potential coil normally connected to the current coils within the meter enclosure and for testing energy meters having but one current coil and a potential coil normally connected to the current coil within the meter enclosure with the terminals of the potential coils remaining connected to the current coils during the test, said apparatus comprising a loading transformer having two secondary windings, means for connecting the two coils of a two coil meter in separate circuits including the separate transformer windings and means for connecting the coil of a one current coil meter in circuit with both transformer windings.

16. In electrical apparatus providing dependent sources of alternating voltage and corresponding currents having variable time-phase relationships between the current and the voltage and wherefrom the voltages and currents are translated through translating devices having variable ratios and having fixed phase angle characteristics and thereby applied to utilization circuits to create in the utilization circuits derived voltages and currents having phase relationships corresponding to the source current and voltage phase relationships, the combination with such apparatus of: a second source of alternating current voltage having fixed phase and magnitude relationships to the first source voltage, and a voltage translating device for receiving the voltage of the second source and for impressing a voltage derived from the second source voltage in series with the voltage derived from the voltage of the first source, to cause the existence of a voltage in said derived voltage circuit which is the resultant of the two derived voltages.

17. In electrical apparatus providing dependent sources of alternating voltage and corresponding currents having time-phase relationships and wherefrom the voltages and currents are translated through adjustable ratio translating devices and thereby applied to utilization circuits to create in the utilization circuits derived voltages and currents of fixed magnitude and fixed phase angle for all ratios and having phase relationships corresponding to, but not necessarily equal to, the source current and voltage phase relationships, the combination with such apparatus of: a second source of alternating voltage having fixed phase and magnitude relationships to the first source voltage, and a voltage translating device for receiving the voltage of the second source and for impressing a voltage derived from the second source voltage in a utilization circuit carrying the voltage derived from the voltage of the first source of a magnitude to cause a certain phase relationship to exist between the derived voltage and current in the utilization circuits.

18. In electrical measuring apparatus including: circuits providing sources of phase related voltage and current, variable ratio means having constant phase angle characteristics providing for the derivation of voltage and current from the sources; measuring circuits including apparatus for measuring in accordance with the derived voltage and current; and means for applying the derived voltage and current to the measuring circuits, the combination therewith of: a second source of voltage having fixed phase and magnitude relation to the voltage of the first source, and means for applying a voltage derived from the second source in the measuring circuit to which the first mentioned derived voltage is applied.

19. In electrical apparatus including: circuits providing sources of phase related voltage and current, means having constant phase angle characteristics providing for the derivation of voltage and current from the sources; utilization circuits including apparatus for operating in accordance with the derived voltage and current; and means for applying the derived voltage and current to the utilization circuits; the combination therewith of: a second source of voltage having fixed phase and magnitude relation to the voltage of the first source, and means for applying a voltage derived from the second source in the utilization circuit to which the first mentioned derived voltage is applied to cause a certain phase relationship to exist between the resultant of the derived voltages and the derived current.

20. Apparatus for measuring alternating current power effects in source circuits manifesting voltages and dependent currents comprising, in combination: means for indicating the power effects; translating apparatus for translating voltages and currents from said source circuits having constant phase angle characteristics and including utilization circuits for applying them to the indicating means; a second source of alternating voltage having fixed phase and magnitude relationship to the source circuit voltage; and means for applying a voltage derived from the second source voltage in the utilization voltage circuit to establish a certain phase angle relationship between the voltage and the current applied to the indicating means.

21. Apparatus for reflecting in derived circuits, and in various fixed ratios, alternating current power effects in source circuits manifesting voltages and currents comprising, in combination: mechanism for producing an effect in accordance with the power effect, said mechanism including a current element and a voltage element; translating apparatus for translating in various ratios derived voltages and currents from said source circuits in a manner to produce like phase angles between derived voltages and currents in all ratios and including utilization circuits for applying the derived voltages and currents to the respective current and voltage elements of the mechanism; and means for applying an alternating voltage having a fixed phase and magnitude relationship to the source circuit voltage in the voltage utilization circuit to modify the effect of the translated derived voltages and currents on the mechanism.

22. Apparatus for providing indications of power effects of power sources operating at several voltage levels and with currents phase related thereto comprising a mechanism capable of providing such indications with a high degree of accuracy in a fixed voltage range and including voltage and current elements, adjustable translating apparatus for deriving voltages from the power source whose values are within the voltage accuracy range of the mechanism; translating apparatus for applying currents derived from the source to the mechanism; and means including a fixed ratio translating device for applying a derived phase angle correcting voltage in the voltage circuit of the mechanism comprising a second voltage source having a fixed magnitude and phase relation to the voltage of the power source.

23. Apparatus for providing indications of power effects of power sources operating at several voltage and current levels and with currents phase related to the voltage comprising a mechanism capable of providing such indications with a high degree of accuracy in a fixed voltage range and including voltage and current elements, adjustable translating apparatus for deriving voltages from the power source whose values are within the voltage accuracy range of the mechanism; adjustable translating apparatus for applying currents at one level, derived from currents of the source, to the mechanism; and means including a fixed ratio translating device for applying a derived phase angle correcting voltage in the voltage circuit of the mechanism and comprising a second voltage source having a fixed magnitude and phase relationship to the voltage of the first source.

24. In testing apparatus adapted to test measuring instruments of different voltage and different current ratings from a single source of energy without the expenditure of energy equal to the energy expended in circuits normally measured by such instruments and by the aid of a single instrument standard; transformer means for applying currents translated from the source in predetermined amounts to the instrument under test and transformer means for translating all values of the applied currents to a constant nominal translated value for application to the standard instrument; transformer means for applying voltages translated from the source in predetermined values to the instrument under test; and means including a voltage transformer for causing the voltages applied to the standard instrument to bear the same phase relation to the current applied to its as the voltages and currents applied to the instrument under test bear to each other.

25. In instruments for measuring quantities dependent upon both voltage and current of sources of alternating current energy; variable ratio current transformer means for applying currents translated from the source to a fixed nominal value for application to the measuring instrument; voltage transformer means for applying voltages translated from the source to a fixed nominal value for application to the instrument; and means including a fixed ratio voltage transformer for causing the voltages applied to the instrument to bear the same phase relation to the current applied to it as the voltages and currents of the source bear to each other.

26. In apparatus for operating in accordance with quantities dependent upon both voltage and current of sources of alternating current energy; variable ratio current transformer means for applying currents translated from the source to a fixed nominal value for application to the apparatus; voltage transformer means for applying voltages translated from the source to a fixed nominal value for application to the apparatus; and means including a fixed ratio voltage transformer for causing the voltages applied to the apparatus to bear the same phase relation to the current applied to it as the voltages and currents of the sources bear to each other.

27. In alternating current apparatus for operation in accordance with electrical quantities dependent upon the voltage and the current of a circuit, a device constructed and arranged to operate with a high degree of precision when voltages and currents within narrow magnitude limits are applied thereto, variable ratio transformer means having high accuracy ratios for translating voltages and currents from such circuits and applying them, within the magnitude limits of accuracy, to the device; and means including a second source of alternating voltage having a fixed phase and magnitude relation to the voltage of the first source for applying a phase corrective component of voltage in the voltage circuit of the device.

28. In alternating current measuring apparatus for measuring electrical quantities dependent upon the voltage and the current of a circuit, an instrument constructed and arranged to operate with a high degree of accuracy when voltages and currents within narrow magnitude limits are applied thereto, variable ratio transformer means having high accuracy ratios for translating voltages and currents from such circuits and applying them, within the magnitude limits of accuracy, to the instrument; and means including a second source of alternating voltage having a fixed phase and magnitude relation to the voltage of the first source for applying a phase corrective component of voltage in the voltage circuit of the instrument.

References Cited in the file of this patent

UNITED STATES PATENTS

| Number | Name | Date |
|---|---|---|
| 698,658 | Duncan | Apr. 29, 1902 |
| 1,175,222 | Blakeslee | Mar. 14, 1916 |
| 1,357,197 | Brooks | Oct. 26, 1920 |
| 1,587,841 | Knopp | June 8, 1926 |
| 1,761,638 | Newman | June 3, 1930 |
| 1,774,944 | Petch | Sept. 2, 1930 |
| 1,861,076 | Austin | May 31, 1932 |
| 2,130,842 | Harder | Sept. 20, 1938 |
| 2,205,309 | Riordan | June 18, 1940 |
| 2,241,181 | Bushnell | May 6, 1940 |
| 2,243,162 | Lee | May 27, 1941 |
| 2,251,373 | Olsson | Aug. 5, 1941 |
| 2,283,711 | Welch | May 19, 1942 |
| 2,390,811 | Petzinger | Dec. 11, 1945 |